(12) United States Patent
Sugi et al.

(10) Patent No.: US 8,970,890 B2
(45) Date of Patent: Mar. 3, 2015

(54) IMAGE FORMING APPARATUS AND IMAGE FORMING METHOD FOR ADJUSTING IMAGE QUALITY

(71) Applicant: Fuji Xerox Co., Ltd., Tokyo (JP)

(72) Inventors: Shinsuke Sugi, Kanagawa (JP); Jun Koyatsu, Kanagawa (JP); Kenji Mori, Kanagawa (JP); Shinji Tabata, Kanagawa (JP); Yoshiki Matsuzaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/054,885

(22) Filed: Oct. 16, 2013

(65) Prior Publication Data

US 2014/0376036 A1     Dec. 25, 2014

(30) Foreign Application Priority Data

Jun. 21, 2013   (JP) ................. 2013-131008

(51) Int. Cl.
| | |
|---|---|
| G06F 15/00 | (2006.01) |
| G06K 1/00 | (2006.01) |
| H04N 1/60 | (2006.01) |
| H04N 1/40 | (2006.01) |

(52) U.S. Cl.
CPC ..................... *H04N 1/40* (2013.01)
USPC ......................... 358/1.15; 358/1.9

(58) Field of Classification Search
CPC .......... H04N 1/40; H04N 1/52; H04N 1/6033
USPC ............................... 358/1.1, 1.15, 1.9
See application file for complete search history.

(56) References Cited

U.S. PATENT DOCUMENTS

| | | | |
|---|---|---|---|
| 2004/0246533 A1* | 12/2004 | Touura | 358/461 |
| 2009/0207455 A1* | 8/2009 | Hayaishi | 358/3.24 |
| 2011/0318032 A1 | 12/2011 | Murayama et al. | |

FOREIGN PATENT DOCUMENTS

JP       2012-008479 A     1/2012

* cited by examiner

*Primary Examiner* — Douglas Tran
(74) *Attorney, Agent, or Firm* — Sughrue Mion, PLLC

(57) ABSTRACT

An image forming apparatus includes a level selecting unit, an image quality adjusting unit, and an image forming unit. The level selecting unit selects one of a plurality of levels each distributed to one of a plurality of adjustment items affecting an image quality determining factor that determines image quality. The plurality of adjustment items are different from each other. The image quality adjusting unit adjusts a value of each of the adjustment items belonging to the level selected by the level selecting unit and any other level shallower than the selected level such that the image quality corresponding to the image quality determining factor approaches predetermined image quality. The image forming unit forms an image having image quality according to the value adjusted by the image quality adjusting unit.

6 Claims, 18 Drawing Sheets

FIG. 5

| IMAGE QUALITY DETERMINING FACTOR | | TONE | DENSITY NON-UNIFORMITY | COLOR REGISTRATION |
|---|---|---|---|---|
| ADJUSTMENT ITEM | LEVEL 1 | LUT | ANALOG EXPOSURE CONTROL | IMAGE PROCESSING |
| | LEVEL 2 | DEVELOPMENT POTENTIAL | DIGITAL IMAGE PROCESSING | — |
| | LEVEL 3 | TONER CONCENTRATION | — | — |

# IMAGE FORMING APPARATUS AND IMAGE FORMING METHOD FOR ADJUSTING IMAGE QUALITY

CROSS-REFERENCE TO RELATED APPLICATIONS

This application is based on and claims priority under 35 USC 119 from Japanese Patent Application No. 2013-131008 filed Jun. 21, 2013.

BACKGROUND

Technical Field

The present invention relates to an image forming apparatus and an image forming method.

SUMMARY

According to an aspect of the invention, there is provided an image forming apparatus including a level selecting unit, an image quality adjusting unit, and an image forming unit. The level selecting unit selects one of plural levels each distributed to one of plural adjustment items affecting an image quality determining factor that determines image quality. The plurality of adjustment items are different from each other. The image quality adjusting unit adjusts a value of each of the adjustment items belonging to the level selected by the level selecting unit and any other level shallower than the selected level such that the image quality corresponding to the image quality determining factor approaches predetermined image quality. The image forming unit forms an image having image quality according to the value adjusted by the image quality adjusting unit.

BRIEF DESCRIPTION OF THE DRAWINGS

An exemplary embodiment of the present invention will be described in detail based on the following figures, wherein:

FIG. 5 is a diagram illustrating a table of image quality determining factors and adjustment items;

DETAILED DESCRIPTION

An exemplary embodiment of the present invention will be described below.

Figure 1:
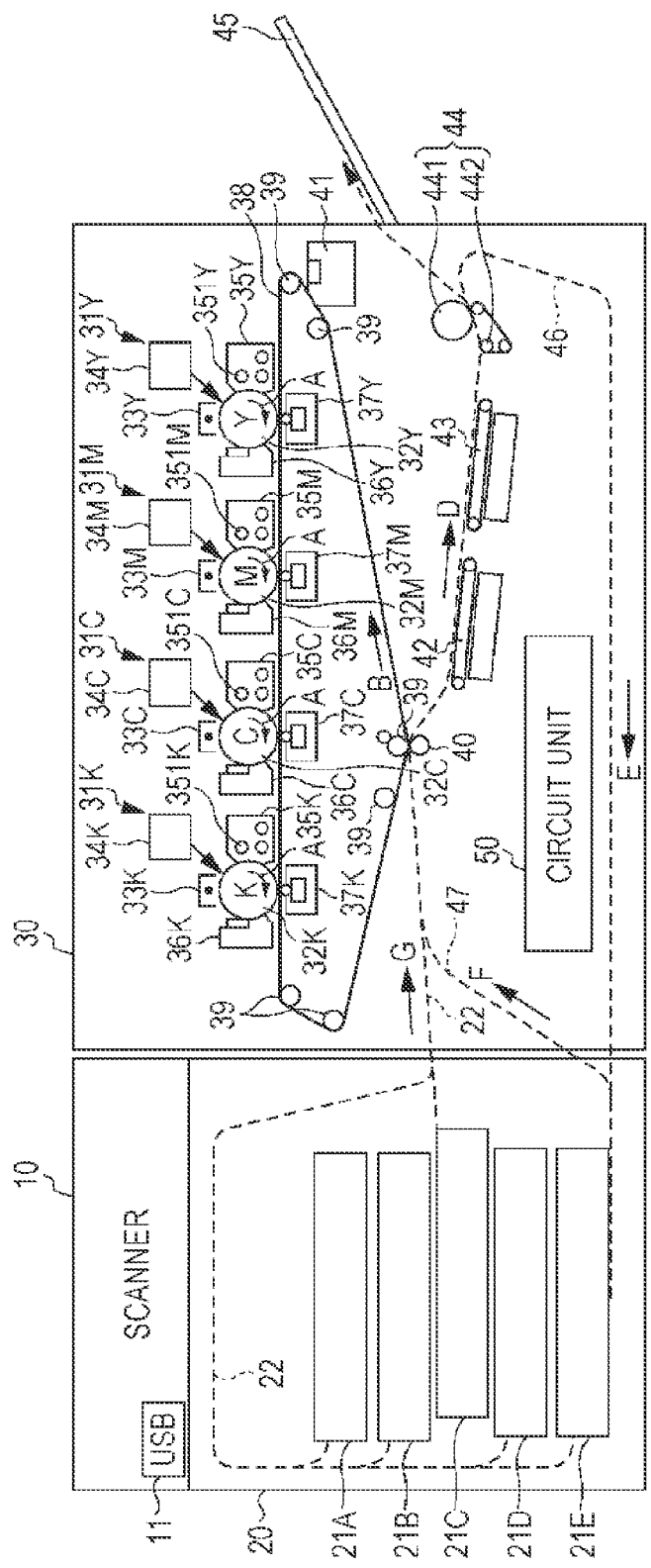
FIG. 1 is a schematic diagram of an image forming apparatus according to an exemplary embodiment of the invention.

FIG. 1 is a schematic diagram of an image forming apparatus 1 according to an exemplary embodiment of the invention.

The image forming apparatus 1 includes a scanner 10, a sheet stock unit 20, and an image forming unit 30.

The scanner 10 is a module that reads an image on a document and generates image formation.

The scanner 10 includes a universal serial bus (USB) connector 11 conforming to USB standards. The USB connector 11 is connected to a colorimeter (not illustrated). Data measured by the colorimeter is input to the image forming apparatus 1. Detailed description thereof will be given later.

In the example illustrated herein, the sheet stock unit 20 includes five sheet trays 21A to 21E.

Each of the sheet trays 21A to 21E stores a stack of sheets different (or the same) in type and/or size among the sheet trays 21A to 21E. A sheet extracted from one of the sheet trays 21A to 21E is transported in the direction of arrow G on a transport path 22 indicated by a broken line, enters the image forming unit 30, and is further transported.

The image forming unit 30 is a module that prints out an image on the sheet sent from the sheet stock unit 20 on the basis of the image information generated by the scanner 10.

The image forming unit 30 includes four image forming engines 31Y, 31M, 31C, and 31K. Each of the image forming engines 31Y, 31M, 31C, and 31K forms a toner image by using toner of the corresponding one of yellow (Y), magenta (M), cyan (C), and black (K) colors.

In the following, constituent elements corresponding to the respective colors (Y, M, C, and K) will be represented only by reference numerals without the suffixes Y, M, C, and K indicating the colors, except when it is necessary to describe the constituent elements with distinction between the colors.

Each of the image forming engines 31 includes a photoconductor 32 that rotates in the direction of arrow A. The photoconductor 32 is surrounded by a charging device 33, an exposing device 34, a developing device 35, and a cleaner 36. Further, a first transfer device 37 is provided at a position facing the photoconductor 32 across an intermediate transfer belt 38 described below.

The intermediate transfer belt 38 is an endless belt which is wound around plural rollers 39, includes a path extending along the photoconductors 32 included in the four image forming engines 31, and circularly moves in the direction of arrow B. A second transfer device 40 and a cleaner 41 are provided around the intermediate transfer belt 38.

In this configuration, the charging device 33 uniformly charges a surface of the photoconductor 32. Further, the exposing device 34 repeatedly scans the surface of the photoconductor 32 with a light beam modulated in accordance with the image information in a direction perpendicular to the drawing plane of FIG. 1 (a main scanning direction), to thereby form an electrostatic latent image on the photoconductor 32.

The developing device 35 stores developer including carrier and toner of the color according to the corresponding image forming engine 31. The developer is transported by a development roller 351 to a position facing the photoconductor 32. A development potential is generated between the photoconductor 32 and the development roller 351. The electrostatic latent image on the photoconductor 32 is developed with the toner of the developer transported by the development roller 351. With this development, a toner image is formed on the photoconductor 32.

The toner images formed on the respective photoconductors 32 are transferred onto the intermediate transfer belt 38 in a sequentially superimposed manner by the action of the first transfer devices 37.

The photoconductors 32 are cleaned by the respective cleaners 36 after the transfer of the toner images to the intermediate transfer belt 38.

The toner images transferred to the intermediate transfer belt 38 in the sequentially superimposed manner are transferred by the action of the second transfer device 40 onto the sheet transported to the position of the second transfer device 40 in synchronization with the transport of the toner images on the intermediate transfer belt 28 to the same position. The intermediate transfer belt 38 after the transfer process is cleaned by the cleaner 41.

The sheet having the toner images transferred thereto by the action of the second transfer device 40 is further transported in the direction of arrow D by sheet transport belts 42 and 43, and passes through a fixing device 44. The fixing device 44 holds the transported sheet between a roller 441 and a belt 442 and applies heat and pressure to the sheet, to thereby cause the toner images on the sheet to be fixed thereon. The sheet having the toner images fixed thereon by passing through the fixing device 44 is discharged onto a sheet output tray 45. The sheet discharged on the sheet output tray 45 is printed with an image formed by the fixed toner images.

To form images on both surfaces of a sheet, a sheet having an image formed on one surface thereof by passing through the fixing device 44 is transported on a transport path 46 in the direction of arrow E to return to the sheet stock unit 20. Thereafter, the sheet is reversed in transport direction to be transported on a transport path 47 in the direction of arrow F, and again reaches the second transfer device 40. Meanwhile, toner images to be transferred to the other surface of the sheet are transferred onto the intermediate transfer belt 38 and transported to the position of the second transfer device 40 in a similar manner as in the above-described process. Then, the toner images on the intermediate transfer belt 38 are transferred onto the sheet. The sheet having the toner images transferred thereto passes through the fixing device 44, and is discharged onto the sheet output tray 45 this time. The discharged sheet has images printed on both surfaces thereof.

The image forming unit 30 further includes a circuit unit 50. The circuit unit 50 includes an arithmetic circuit that performs various arithmetic operations required by the image forming apparatus 1, a memory that stores various set values, a later-described look up table (LUT), and so forth, and a control circuit that controls the respective units of the image forming apparatus 1. The circuit unit 50 further includes a communication circuit that communicates with a later-described remote controlling apparatus.

Figure 2:
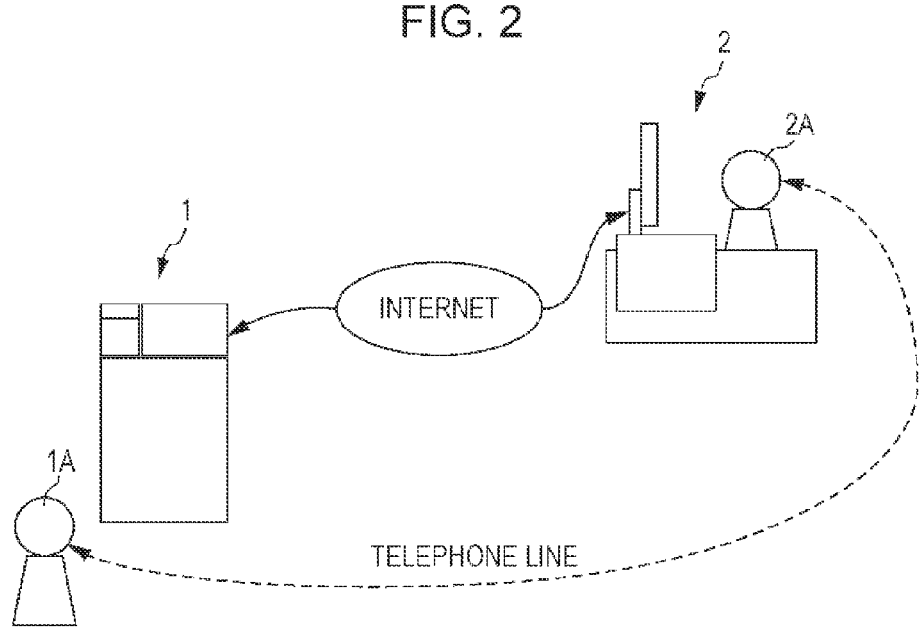
FIG. 2 is a schematic diagram illustrating a communication environment of the image forming apparatus illustrated in FIG. 1.

FIG. 2 is a schematic diagram illustrating a communication environment of the image forming apparatus 1 illustrated in FIG. 1.

The image forming apparatus 1 illustrated in FIG. 1 is connected to a remote controlling apparatus 2 via the Internet. The remote controlling apparatus 2 is installed in, for example, a maintenance center or the like prepared by the manufacturer of the image forming apparatus 1, and is operated by an operator 2A knowledgeable of the image forming apparatus 1. Further, a user 1A of the image forming apparatus 1 is capable of conversing with the operator 2A over a telephone line.

Although FIG. 2 illustrates a single image forming apparatus 1 and a single remote controlling apparatus 2, the remote controlling apparatus 2 is connected not only to the image forming apparatus 1 illustrated herein but also to many other apparatuses of the same type or different types. The operator 2A is in charge of the maintenance of those many apparatuses.

Figure 3:
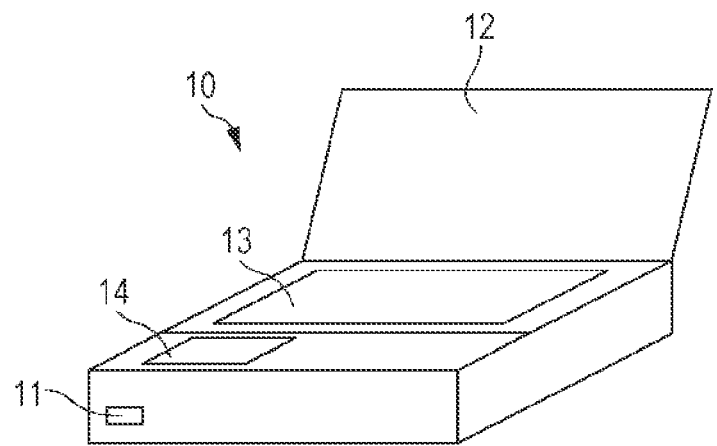
FIG. 3 is a schematic diagram of a scanner illustrated in FIG. 1.

FIG. 3 is a schematic diagram of the scanner 10 illustrated in FIG. 1.

The scanner 10 includes an platen cover 12, and a transparent glass plate 13 extends under the closed platen cover 12.

Further, an optical system and a sensor (not illustrated) for reading the image on the document are provided below the transparent glass plate 13. When the document is placed face down on the transparent glass plate 13 and a start button 141 (see FIG. 4) is pressed with the platen cover 12 closed, the image on the document is read to generate the image information.

The scanner 10 further includes a user interface (UI) panel 14 provided in front of the closed platen cover 12. The UI panel 14 has functions of displaying various information to the user 1A and receiving inputs of various instructions based on operations performed by the user 1A.

The scanner 10 further includes the USB connector 11, as described above. The USB connector 11 is connected to the colorimeter (not illustrated), and the data obtained by the colorimeter is input to the image forming apparatus 1 (see FIG. 1).

Figure 4:
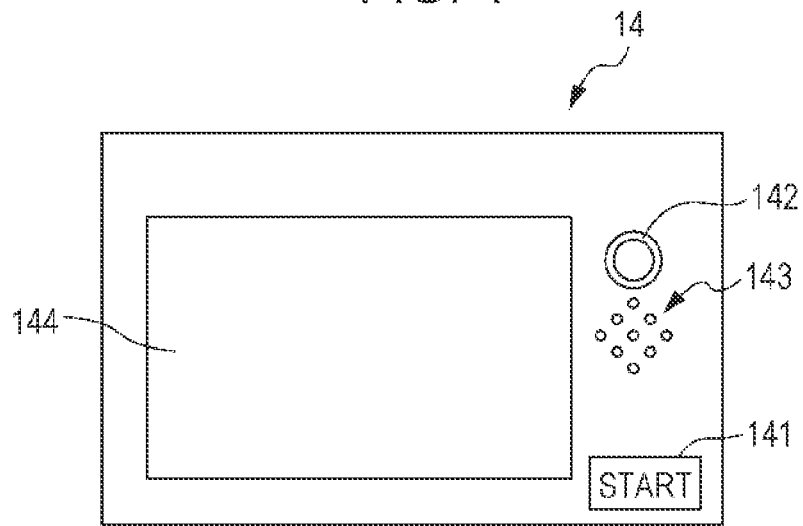
FIG. 4 is a schematic diagram of a user interface (UI) panel included in the scanner illustrated in FIG. 3.

FIG. 4 is a schematic diagram of the UI panel 14 included in the scanner 10 illustrated in FIG. 3.

The UI panel 14 includes the start button 141, a speaker 142, holes for a microphone (hereinafter simply referred to as the microphone 143), and a touch panel 144 for display and user operation.

The start button 141 is a push button for instructing the scanner 10 (see FIGS. 1 and 3) to start reading the image on the document.

The speaker 142 and the microphone 143 play a role in the conversation via the telephone line with the operator 2A operating the remote controlling apparatus 2 illustrated in FIG. 2.

The touch panel 144 has functions of displaying various information from the image forming apparatus 1 and inputting various instructions to the image forming apparatus 1 in accordance with the pressing of buttons displayed on the touch panel 144.

FIG. 5 is a diagram illustrating a table of image quality determining factors and adjustment items.

An "image quality determining factor" determines the image quality of the image formed by the image forming apparatus 1 (see FIG. 1). FIG. 5 illustrates "tone," "density non-uniformity," and "color registration" as the "image quality determining factors." Although there are many other factors determining the image quality of the image than the above-described three factors, these three factors will be described herein.

Further, an "adjustment item" affects the corresponding "image quality determining factor." Herein, three adjustment items of "LUT," "development potential," and "toner concentration" are provided for the "tone" as one of the "image quality determining factors." If any of the three adjustment items is changed in set value, the "tone" changes. In the following, a phrase such as "correction amount" or "adjustment amount" will be used as an expression corresponding to the "set value," depending on what is being discussed.

Further, two adjustment items of "analog exposure control" and "digital image processing" are provided for the "density non-uniformity" as one of the "image quality determining factors." If any of the two adjustment items is changed in set value, the "density non-uniformity" is affected.

Further, "image processing" is provided as an adjustment item for the "color registration." The "color registration" is adjusted by the "image processing."

Further, "level 1," "level 2," and "level 3" illustrated in FIG. 5 correspond to an example of "levels" according to an exemplary embodiment of the present invention. The closer to "level 1," the shallower the level is. The closer to "level 3," the deeper the level is. Each of the "adjustment items" is assigned to one of the levels.

As to the three "adjustment items" corresponding to the "tone" as an "image quality determining factor," the "LUT" is assigned to "level 1," the "development potential" is assigned to "level 2," and the "toner concentration" is assigned to "level 3."

In the adjustment of the image quality, one of "level 1" to "level 3" is selected, as described later. Upon selection of the level, the set value of each of the adjustment items belonging to the level and any other level shallower than the level is adjusted. For example, to correct the "tone" when "level 1" is selected, the "LUT" is adjusted such that the tone of the image approaches a predetermined tone. Further, to correct the "tone" when "level 2" is selected, two adjustment items, i.e., the "development potential" as the adjustment item assigned to "level 2" and the "LUT" as the adjustment item assigned to "level 1," are adjusted such that the tone of the image approaches a predetermined tone. Similarly, to correct the "tone" when "level 3" is selected, three adjustment items, i.e., the "toner concentration" as the adjustment item assigned to "level 3," the "development potential" as the adjustment item assigned to "level 2," and the "LUT" as the adjustment item assigned to "level 1," are comprehensively adjusted such that the tone of the image approaches a predetermined tone.

Herein, the "LUT" assigned to "level 1" is favorable in that the risk of conversely degrading the tone owing to a failure to correct the tone is the lowest. The "LUT," however, is limited in tone correction performance in that it is difficult to increase the maximum density by using the "LUT."

It is possible to adjust the maximum density by adjusting the "development potential" assigned to "level 2," although this adjustment is limited as compared with the case in which the "toner concentration" assigned to "level 3" is also adjusted. The adjustment of the "development potential," however, has a risk of image quality deterioration due to the occurrence of "fog density on the background" in the image or an image quality defect due to the scattering of not only the toner but also the carrier over the photoconductor 32 from the development roller 351 illustrated in FIG. 1 in the development process. Meanwhile, it is possible to immediately undo the setting of the "development potential," if the tone correction by the adjustment of the "development potential" fails.

If the "toner concentration" assigned to "level 3" is also adjusted, it is possible to adjust all aspects of the tone including the maximum density. The adjustment of the toner concentration, however, also involves the risk of image quality deterioration or an image quality defect, similarly as in the above-described case. Further, it takes time to change the toner concentration. It also takes time to undo the setting of the toner concentration, if the tone correction by the adjustment of the toner concentration fails. Thus, this adjustment has low responsiveness. Also in this regard, the change of the toner concentration involves a substantially high risk.

Particularly when the user 1A uses sheets other than the sheets recommended by the manufacturer, the maximum density may fail to increase irrespective of any possible correction of the tone. In this case, leaving the tone correction to the user 1A involves a high risk.

Further, as to the two adjustment items affecting the "density non-uniformity" as an "image quality determining factor," the "analog exposure control" is assigned to "level 1," and the "digital image processing" is assigned to "level 2."

To adjust the "density non-uniformity" when "level 1" is selected, the "analog exposure control" is performed to adjust the density non-uniformity such that the image quality approaches predetermined image quality. Further, to adjust the "density non-uniformity" when "level 2" is selected, the "digital image processing" and the "analog exposure control" are both performed to adjust the density non-uniformity such that the image quality approaches predetermined image quality. Meanwhile, "level 3" is not assigned with an adjustment item for the density non-uniformity. To adjust the "density non-uniformity" when "level 3" is selected, therefore, the "digital image processing" and the "analog exposure control" are both performed to adjust the density non-uniformity such that the image quality approaches predetermined image quality, similarly as in the case in which "level 2" is selected.

Herein, the density non-uniformity correction by the "analog exposure control" assigned to "level 1" is easily executable. This correction, however, uniformly corrects the one-dimensional slope of shading in the main scanning direction in the entire density range of the image, and is incapable of correcting the slope for each of the densities of the image.

Meanwhile, according to the "density non-uniformity" correction by the "digital image processing" assigned to "level 2," it is possible to correct the slope for each of the densities of the image in the entire density range of the image. In this "density non-uniformity" correction, a later-described test pattern is read by the scanner 10 (see FIGS. 1 and 3). A reading error tends to be increased particularly at a high density. Further, the risk of a correction failure is increased if the "density non-uniformity" correction is performed on the basis of the reading by an uncalibrated scanner. Further, if the "density non-uniformity" correction is performed only by the "digital image processing," steps between digital correction values may appear and become noticeable in the image. Meanwhile, the "analog exposure control," which has low responsiveness to changes, rounds off the steps and realizes a smooth image. When the "density non-uniformity" correction by the "digital image processing" is performed, therefore, the "density non-uniformity" correction by the "analog exposure control" is also performed to compensate for the shortcoming of the "digital image processing."

The "image processing" as the adjustment item corresponding to the "color registration" is assigned to "level 1." As to the "color registration," no adjustment item is assigned to "level 2" and "level 3." Thus, the "color registration" is adjusted only by the "image processing" such that the image quality approaches predetermined image quality, when any of "level 1" to "level 3" is selected.

The image forming unit 30 illustrated in FIG. 1 forms an image according to the set value of each of the setting items adjusted as described above.

Herein, the user 1A intending to adjust the image quality is constantly allowed to perform the image quality adjustment at "level 1" described above.

Meanwhile, "level 2" is selected if it is determined that accurate image quality adjustment is expected as a result of checking a factor of the image forming apparatus 1 illustrated in FIG. 1 affecting the accuracy of the image quality adjustment. As a specific example, in the present exemplary embodiment, the time of the last calibration of the scanner 10 is checked, and "level 2" is selected if the time elapsed after the last calibration of the scanner 10 is within one month, or if the scanner 10 is calibrated this time.

Further, in the present exemplary embodiment, "level 3" is selected only via the Internet line by the remote controlling apparatus 2 illustrated in FIG. 2 on the basis of the decision of the operator 2A operating the remote controlling apparatus 2. The operator 2A converses with the user 1A of the image forming apparatus 1 over the phone to ask about the status of the image forming apparatus 1. Then, "level 3" is set on the basis of the decision of the operator 2A that it is safe to allow the user 1A to perform the adjustments up to "level 3." A major criterion for decision making in this case is whether or not the sheets recommended by the manufacturer are used in the image forming apparatus 1. If it is determined safe to trust the user 1A on the basis of the confirmation, as a major criterion for decision making, that the sheets recommended by the manufacturer are used in the image forming apparatus 1 or that the sheets in the image forming apparatus 1 have been changed to the sheets recommended by the manufacturer, and also on the basis of other information obtained from the user 1A and so forth, "level 3" is selected. If concern remains, "level 2" is selected such that the previous settings are immediately restored if the adjustment fails.

Figure 6:
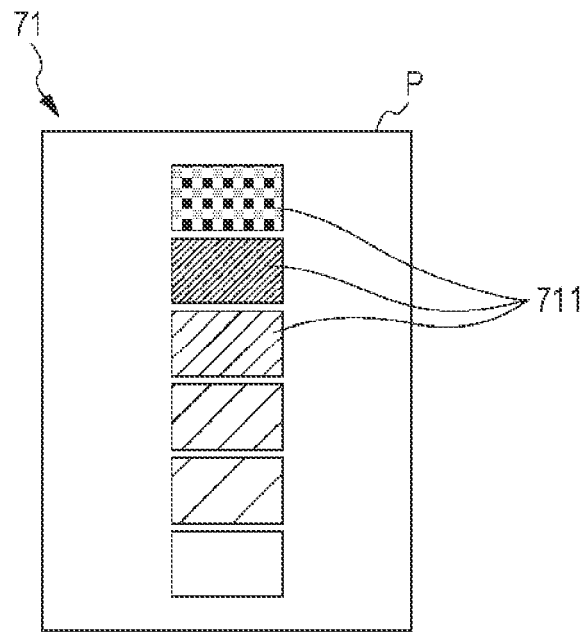
FIG. 6 is a schematic diagram of a test pattern printed out in tone correction.

FIG. 6 is a schematic diagram of an example of the test pattern printed out by the image forming apparatus 1 in the "tone" correction. The tone correction described below is performed for each of the Y, M, C, and K colors. Since a similar correction method is employed for the respective colors, the following description will be given of the tone correction for one of the colors, without specifying any particular color.

In the correction of the "tone," the image forming apparatus 1 prints out, for example, a test pattern 71, in which plural density patches 711 as illustrated in FIG. 6 are arranged, on a sheet P. Then, the printed-out test pattern 71 is read by the scanner 10. Thereby, the image forming apparatus 1 detects the difference between the target density of each of the density patches 711 and the actual density thereof read by the scanner 10, and corrects the tone to eliminate the difference.

Figure 7:
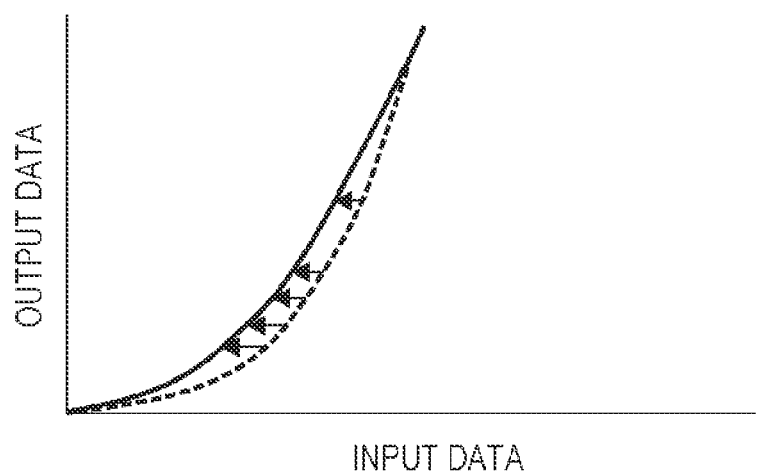
FIG. 7 is a diagram illustrating an example of a "look up table (LUT)" as one of the adjustment items for the tone correction.

FIG. 7 is a diagram illustrating an example of the "LUT" as one of the adjustment items for the "tone" correction.

In accordance with the LUT storing tone conversion data as illustrated in FIG. 7, the image information obtained through the reading of the document by the scanner 10 is subjected to the conversion from input data to output data. If tone conversion data indicated by a broken line in FIG. 7 and stored in the LUT is rewritten with tone conversion data indicated by a solid line in FIG. 7, therefore, the relationship between the input data and the output data changes, and thereby the tone is corrected.

Figure 8:
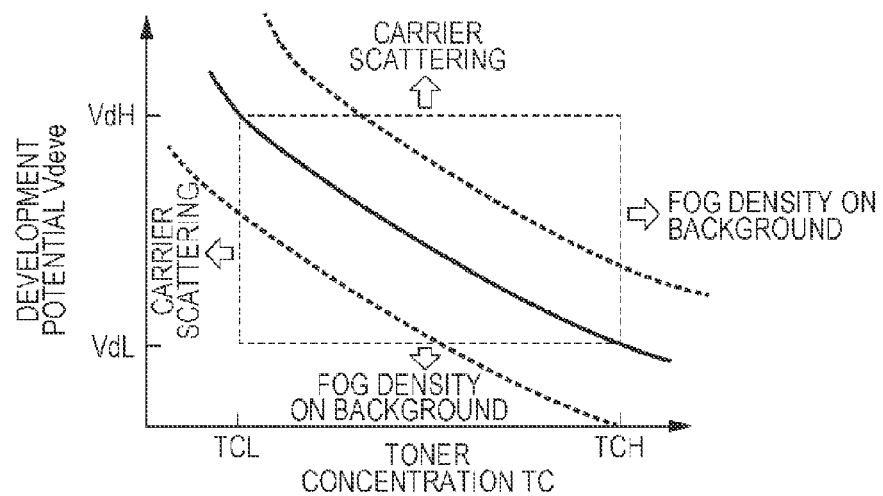
FIG. 8 is an explanatory diagram of the tone correction based on the development potential and the toner concentration.

FIG. 8 is an explanatory diagram of the tone correction by the adjustment of the development potential and the toner concentration.

The horizontal axis of FIG. 8 represents the toner concentration TC. The toner concentration TC relates to the toner and the carrier forming the developer stored in the developing device 35 illustrated in FIG. 1, and represents the value proportional to the ratio of the toner to the carrier.

Further, the vertical axis of FIG. 8 represents the development potential Vdeve. The development potential Vdeve represents the potential difference between the photoconductor 32 illustrated in FIG. 1 and the development roller 351 forming the developing device 35. A curve indicated by a solid line in FIG. 8 corresponds to a given density of the printed-out image, such as a density of 1.6, for example. That is, if the toner concentration TC and the development potential Vdeve are adjusted to match a point on the curve, an image having the density of 1.6 is obtained irrespective of the position of the point on the curve. The solid line curve realizing the density of 1.6 shifts toward one of two correction curves sandwiching the solid line curve, depending on the variation of a factor such as the temperature or humidity of the environment. In a high-temperature, high-humidity environment, for example, the solid line curve shifts toward the lower curve indicated by a broken line. To realize the density of 1.6 in the image, therefore, the toner concentration TC and the development potential Vdeve are adjusted to match a point on the broken line curve.

Herein, the toner concentration TC is adjusted by physically supplying toner into the developing device 35. It is therefore difficult to immediately adjust the toner concentration TC. Thus, the toner concentration TC is fixed to a certain constant toner concentration, and thereafter the density of the image is adjusted by the adjustment of the development potential Vdeve.

If the toner concentration TC falls below a lower density threshold TCL, the carrier scatters over the photoconductor 32 and causes an image quality defect. Meanwhile, if the toner concentration TC exceeds a higher density threshold TCH, the "fog density on the background" occurs in the image and causes the deterioration of the image quality. Accordingly, the toner concentration TC is adjusted to fall within the range between the thresholds TCL and TCH.

Further, if the development potential Vdeve falls below a lower potential threshold VdL, the "fog density on the background" occurs in the image. Meanwhile, if the development potential Vdeve exceeds a higher potential threshold VdH, the scattering of the carrier occurs. Accordingly, the development potential Vdeve is adjusted to fall within the range between the thresholds VdL and VdH.

As described above, the density of the image is also adjustable by the adjustment of the development potential Vdeve or the toner concentration TC. Such adjustment, however, involves the possibility of the "fog density on the background" or the "carrier scattering," and thus has a higher risk than the adjustment of the "LUT." Further, if the adjustment of the development potential Vdeve fails, it is relatively easy to restore the development potential Vdeve to the pre-adjustment value. Meanwhile, the adjustment of the toner concentration TC involves the physical adjustment of the ratio of the toner in the developing device 35, and thus has a risk in that it is difficult to immediately restore the toner concentration TC to the pre-adjustment value if the adjustment fails.

If the tone correction involves the adjustment of the toner concentration TC, the adjustment is performed such that the respective values of the development potential Vdeve and the toner concentration TC are located at the center of an area surrounded by a broken line in FIG. 8. Therefore, adjustment having a high tolerance to variations is possible. Meanwhile, if only the development potential Vdeve is adjusted while the toner concentration TC is fixed, and if the value of the toner concentration TC is close to the threshold TCL or TCH, the range of adjustment of the development potential Vdeve in the area surrounded by the broken line is reduced, and thus accurate adjustment may be prevented.

The correction of the "density non-uniformity" will now be described. The "density non-uniformity" correction is also performed for each of the Y, M, C, and K colors, similarly as in the "tone" correction. Since a similar correction method is employed for the respective colors, the following description will be given of the density non-uniformity correction for one of the colors, without specifying any particular color.

Figure 9A:
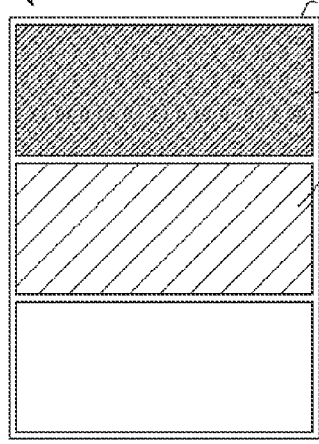
FIGS. 9A and 9B are diagrams illustrating examples of a test pattern for density non-uniformity correction.
Figure 9B:
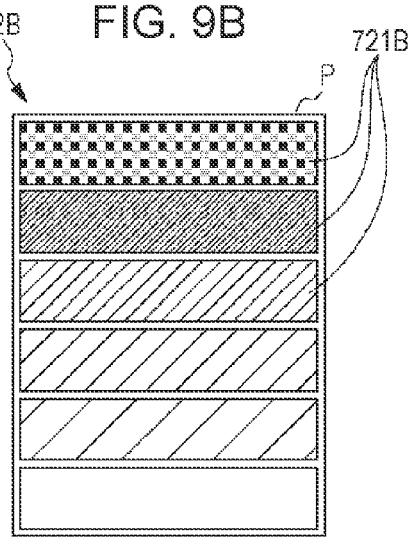

FIGS. 9A and 9B are diagrams illustrating examples of a test pattern for the density non-uniformity correction.

FIG. 9A illustrates a test pattern 72A printed out by the image forming apparatus 1 when "level 1" is selected. The test pattern 72A of FIG. 9A is formed by density patches 721A arranged on the sheet P to extend over the entire width of the sheet P.

FIG. 9B illustrates a test pattern 72B printed out by the image forming apparatus 1 when "level 2" is selected.

In the test pattern 72B, density patches 721B larger in number than the density patches 721A of the test pattern 72A in FIG. 9A are arranged on the sheet P to extend over the entire width of the sheet P. This is for adjusting the "density non-uniformity" more accurately at "level 2" than at "level 1."

After the test pattern 72A illustrated in FIG. 9A or the test pattern 72B illustrated in FIG. 9B is printed out, the test pattern 72A or 72B is read by the scanner 10. In the image forming apparatus 1, the density non-uniformity is recognized through the reading by the scanner 10.

Figure 10:
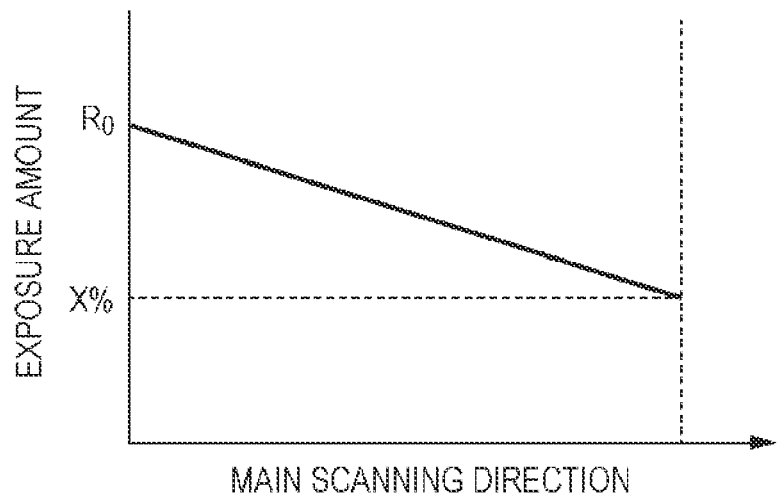
FIG. 10 is an explanatory diagram of "analog exposure control" as an adjustment item assigned to "level 1" of "density non-uniformity;"

FIG. 10 is an explanatory diagram of the "analog exposure control" as the adjustment item assigned to "level 1" of the "density non-uniformity."

As described above with reference to FIG. 1, the exposing device 34 repeatedly scans the surface of the photoconductor 32 with the light beam modulated in accordance with the image information in the main scanning direction perpendicular to the drawing plane of FIG. 1, to thereby form an electrostatic latent image on the photoconductor 32.

FIG. 10 illustrates the change in exposure amount (intensity of the light beam) during one scan with the light beam from the exposing device 34. That is, FIG. 10 indicates that the exposure amount $R_0$ is continuously reduced by X % during one scanning operation in the main scanning direction from the left end to the right end of FIG. 10. With the exposure amount thus changed during the scan, the "density non-uniformity" is corrected. In the single scan, however, the adjustment is not performed for each of the densities of the image. Instead, the light beam is modulated in accordance with the image information, and both high-density regions and low-density regions of the image are rendered during one scan. That is, according to the "analog exposure control," the adjustment for each of the densities of the image is not executable, and only a uniform adjustment over the entire density range is executable.

Figure 11:
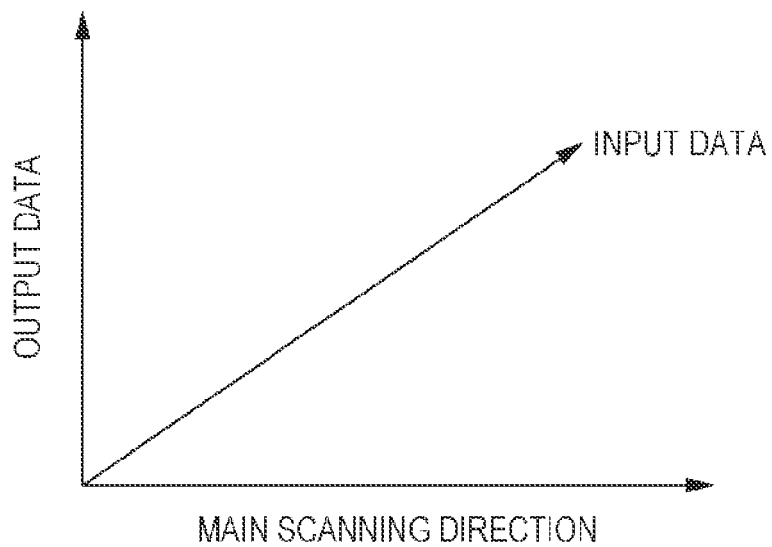
FIG. 11 is an explanatory diagram of "digital image processing" as an adjustment item assigned to "level 2" of "density non-uniformity;"

FIG. 11 is an exemplary diagram of the "digital image processing" as the adjustment item assigned to "level 2" of the "density non-uniformity."

Herein, the main scanning direction and the input data are input to acquire output data. If such a LUT is created, it is possible to obtain output data according to the input data and the position in the main scanning direction, and thus to perform the density non-uniformity correction for each of the densities. If the density non-uniformity correction is performed only on the basis of the LUT, however, steps between values may become noticeable at change points of the data. Therefore, the "density non-uniformity" correction by the "analog exposure control" described above with reference to FIG. 10 is also performed.

The correction of the "color registration" will now be described.

As illustrated in FIG. 5, the "color registration" is corrected by the "image processing."

Figure 12:
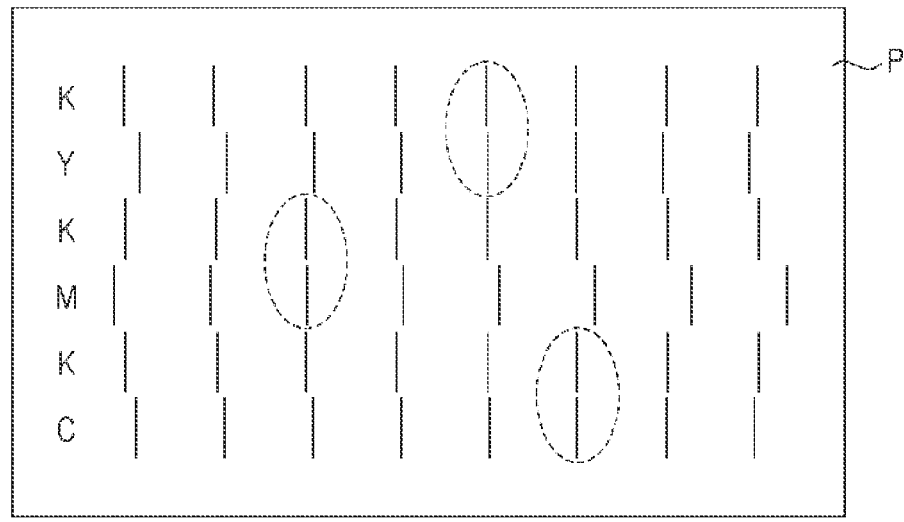
FIG. 12 is a diagram illustrating a test pattern printed out in color registration correction.

FIG. 12 is a diagram illustrating a text pattern 73 printed out in the color registration correction.

The text pattern 73 illustrated in FIG. 12 illustrates misregistration of images of the Y, M, and C colors from reference images of the black (K) color.

After the test pattern 73 is printed out on the sheet P, the printed-out test pattern 73 is read by the scanner 10, and lines of the Y, M, and C colors matching lines of the black (K) color (portions encircled by broken lines in FIG. 12) are recognized. On the basis of the recognition, the image forming timing of each of the image forming engines 31Y, 31M, and 31C for the Y, M, and C colors is adjusted by the image processing. Specifically, the start timing of writing the electrostatic latent image with the light beam from each of the exposing devices 34Y, 34M, and 34C is adjusted by the image processing. Thereby, the respective lines of the Y, M, C, and K colors, which are supposed to be superimposed on one another, are accurately superimposed to form a single line extending in the main scanning direction. Consequently, an image with no color registration error is formed.

A flow of the image quality adjustment process will now be described.

Figure 13:
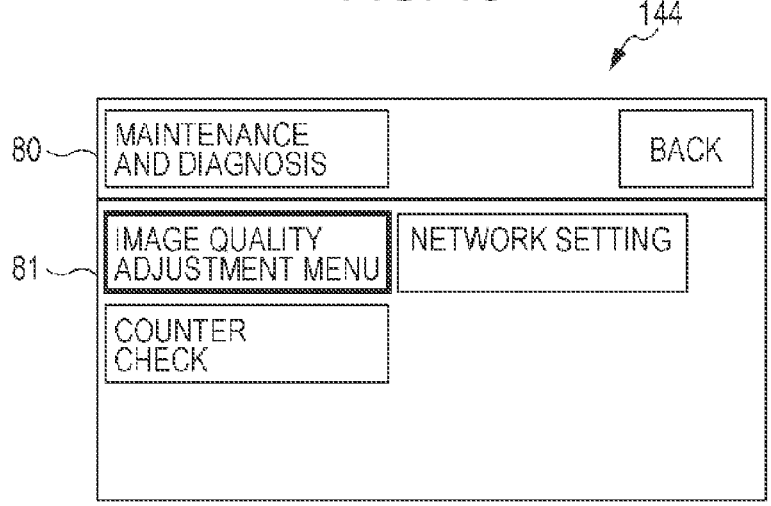
FIG. 13 is a diagram illustrating a "maintenance and diagnosis" screen displayed on a touch panel of the UI panel illustrated in FIG. 4.

FIG. 13 is a diagram illustrating a "maintenance and diagnosis" screen displayed on the touch panel 144 of the UI panel 14 illustrated in FIG. 4.

If a "maintenance and diagnosis" button is pressed on a main menu screen (illustration omitted) displayed on the touch panel 144 illustrated in FIG. 4, the display screen on the touch panel 144 switches to the "maintenance and diagnosis" screen illustrated in FIG. 13. The display screen on the touch panel 144 is divided into an upper title field 80 and a lower menu field 81. In FIG. 13, the title field 80 displays text "maintenance and diagnosis" indicating that the currently displayed screen is the "maintenance and diagnosis" screen and a "back" button for inputting an instruction to return to the immediately preceding screen.

Further, in the menu field 81 of the display screen illustrated in FIG. 13, three buttons of an "image quality adjustment menu" button, a "network setting" button, and a "counter check" button are arranged.

Figure 14:
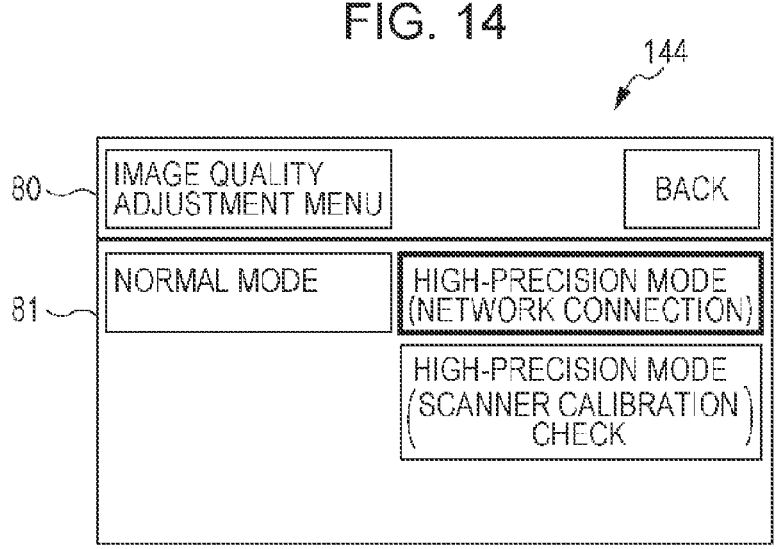
FIG. 14 is a diagram illustrating an "image quality adjustment menu" screen displayed when an "image quality adjustment menu" button on the "maintenance and diagnosis" screen in FIG. 13 is pressed.

If the "image quality adjustment menu" button is pressed, the display screen switches to an "image quality adjustment menu" screen illustrated in FIG. 14. If the "network setting" button is pressed, the display screen switches to a screen for the setting of an Internet protocol (IP) address and so forth. Further, if the "counter check" button is pressed, it is possible to check the sum of the prints made in the past. Further description of the "network setting" and the "counter check" will be omitted here.

FIG. 14 is a diagram illustrating the "image quality adjustment menu" screen displayed when the "image quality adjustment menu" button on the "maintenance and diagnosis" screen in FIG. 13 is pressed. The menu field 81 of the "image quality adjustment menu" screen illustrated in FIG. 14 displays three buttons of a "normal mode" button, a "high-precision mode (network connection)" button, and a "high-precision mode (scanner calibration check)" button.

If the "normal mode" button is pressed, "level 1" illustrated in FIG. 5 is selected to proceed to the image quality adjustment at "level 1." If the "high-precision mode (network connection)" button is pressed, the user 1A is connected to the operator 2A through the telephone line, as illustrated in FIG. 2. Thereby, the image quality adjustment is performed while the user 1A is conversing with the operator 2A by using the speaker 142 and the microphone 143 on the UI panel 14 illustrated in FIG. 4. In this process, the image forming apparatus 1 and the remote controlling apparatus 2 are connected through the Internet. Meanwhile, if the "high-precision mode (scanner calibration check)" button is pressed, whether or not the scanner 10 has been calibrated is checked. The case in which the "high-precision mode (scanner calibration check)" button is pressed will be described later. Herein, the description will continue on the assumption that the "high-precision mode (network connection)" button has been pressed.

Figure 15:
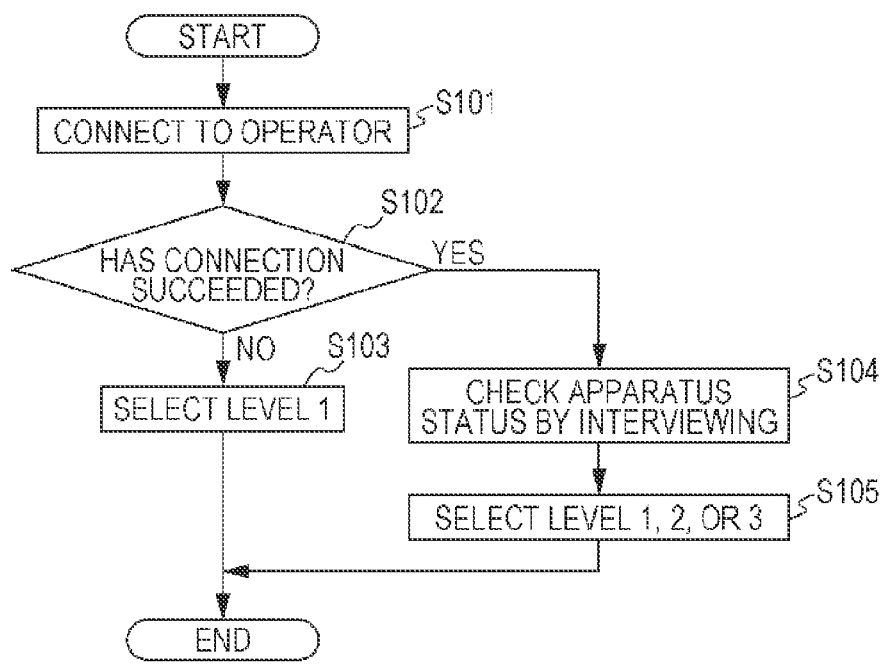
FIG. 15 is a flowchart illustrating a process started by pressing a "high-precision mode (network connection)" button as a trigger.

FIG. 15 is a flowchart illustrating a process started by pressing the "high-precision mode (network connection)" button as a trigger.

In this process, the image forming apparatus 1 and the user 1A are first connected to the remote controlling apparatus 2 and the operator 2A, as illustrated in FIG. 2 (step S101). If the connection fails, such as when the operator 2A is on another line (NO at step S102), "level 1" is selected similarly as in the case in which the "normal mode" button of FIG. 14 is pressed.

In the present exemplary embodiment, the image forming apparatus 1 has a built-in telephone function for connection to the operator 2A, as illustrated in FIG. 4. Therefore, the image forming apparatus 1 is capable of detecting the failure to connect to the operator 2A, and automatically selects "level 1" when the connection fails. Meanwhile, if the image forming apparatus 1 is not provided with the telephone function and the user 1A calls the operator 2A by using an ordinary telephone, the image forming apparatus 1 may be configured to select "level 1" if information notifying that the telephone connection has been established is not input by the user 1A within a predetermined time (three minutes, for example) after the pressing of the "high-precision mode (network connection)" button illustrated in FIG. 14, and to wait for an instruction from the remote controlling apparatus 2 if the information is input within the predetermined time.

If the connection succeeds, an interview by the operator 2A takes place (step S104). That is, the operation at step S104 is performed not by any apparatus or system but by the operator 2A. A major point in the interview by the operator 2A at step S104 is whether or not the sheets recommended by the manufacturer are used in the image forming apparatus 1 of the user 1A, as described above. On the basis of the information of the sheets and various other information obtained by the interview, the operator 2A determines the level of the image quality adjustment to be left to the user 1A, and operates the remote controlling apparatus 2. Then, the image forming apparatus 1 is informed of the level specified by the operation through the Internet line, and the level of the image quality adjustment of the image forming apparatus 1 is selected (step S105).

Description will now be given of the case in which the "high-precision mode (scanner calibration check)" button is pressed on the "image quality adjustment menu" screen illustrated in FIG. 14.

Figure 16:
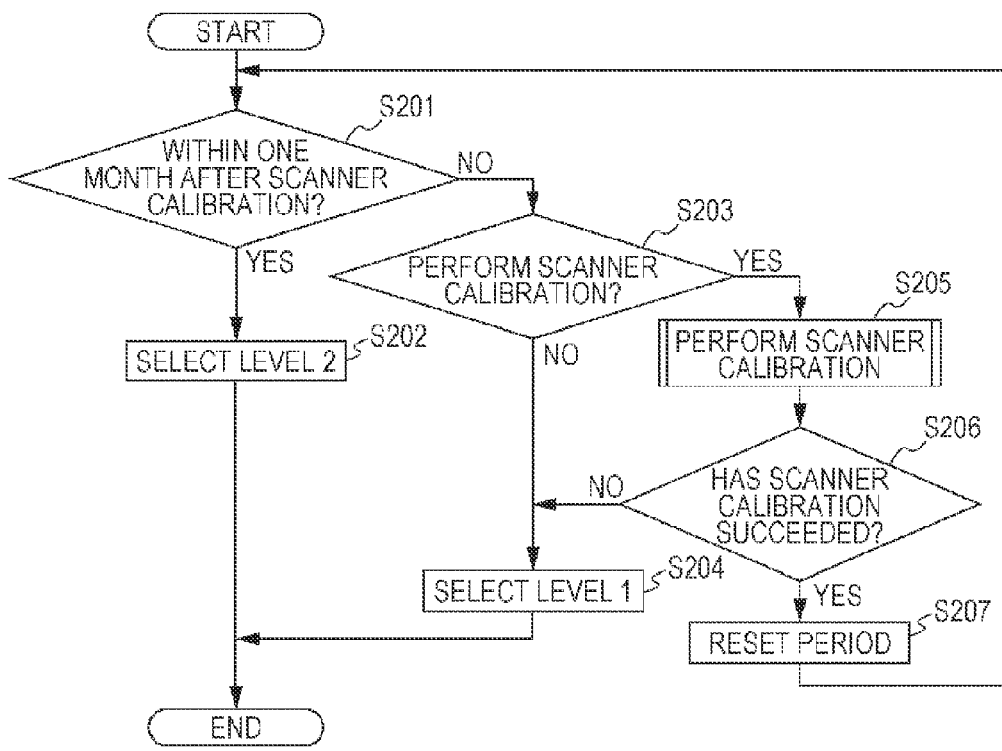
FIG. 16 is a flowchart illustrating a process started by pressing a "high-precision mode (scanner calibration check)" button.

FIG. 16 is a flowchart illustrating a process started by pressing the "high-precision mode (scanner calibration check)" button.

In this process, it is determined whether or not the time elapsed after the last calibration of the scanner 10 is within one month (step S201). If the elapsed time is within one month, "level 2" is selected (step S202).

Figure 17:
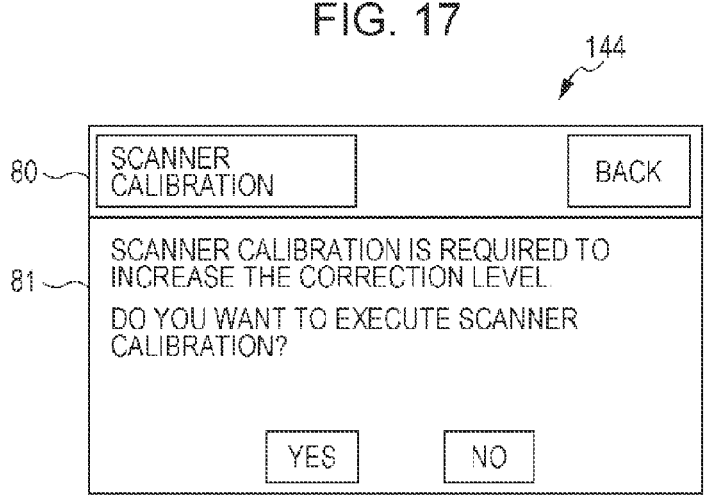
FIG. 17 is a diagram illustrating a "scanner calibration" screen displayed when more than one month has elapsed after a scanner calibration.

FIG. 17 is a diagram illustrating a "scanner calibration" screen displayed when more than one month has elapsed after the last calibration of the scanner 10.

The menu field 81 of the "scanner calibration" screen illustrated in FIG. 17 displays a message "Scanner calibration is required to increase the correction level. Do you want to execute scanner calibration?" and two buttons of a "yes" button and a "no" button.

If it is determined at step S201 in FIG. 16 that more than one month has elapsed after the last calibration of the scanner 10, the "scanner calibration" screen illustrated in FIG. 17 is displayed. If the "no" button is pressed on the "scanner calibration" screen (NO at step S203), "level 1" is selected (step S204).

If the "yes" button is pressed on the "scanner calibration" screen illustrated in FIG. 17 (YES at step S203), the calibration of the scanner 10 is performed (step S205). The calibration of the scanner 10 will be described later. If the calibration of the scanner 10 fails (NO at step S206), "level 1" is set (step S204). If the calibration of the scanner 10 succeeds (YES at step S206), the period from the last calibration of the scanner 10 is reset to zero (step S207), and the process returns to step S201. At step S201, therefore, it is determined this time that the time elapsed after the last calibration of the scanner 10 is within one month, and thus "level 2" is selected.

Figure 18:
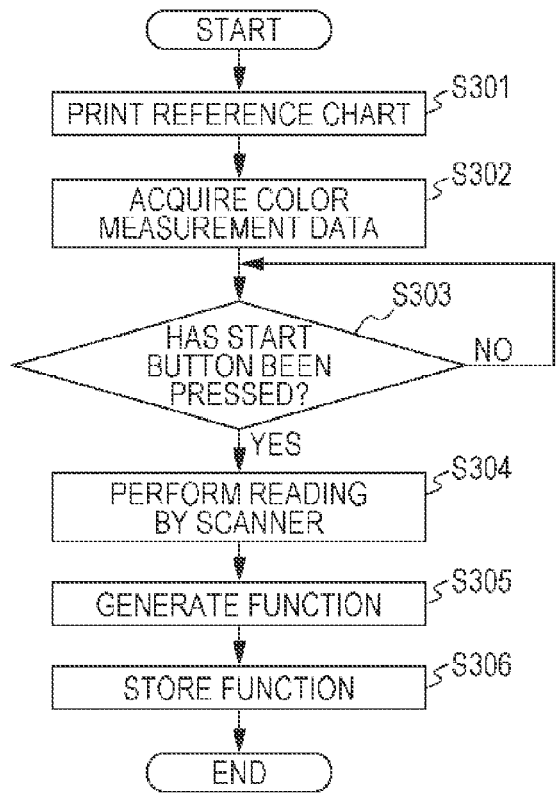
FIG. 18 is a flowchart illustrating a scanner calibration process.

FIG. 18 is a flowchart illustrating the scanner calibration process illustrated as one of the steps in FIG. 16.

In this process, the image forming apparatus 1 illustrated in FIG. 1 first prints out a reference chart for the scanner calibration (step S301). Illustration and description of details of the reference chart will be omitted.

Figure 19:
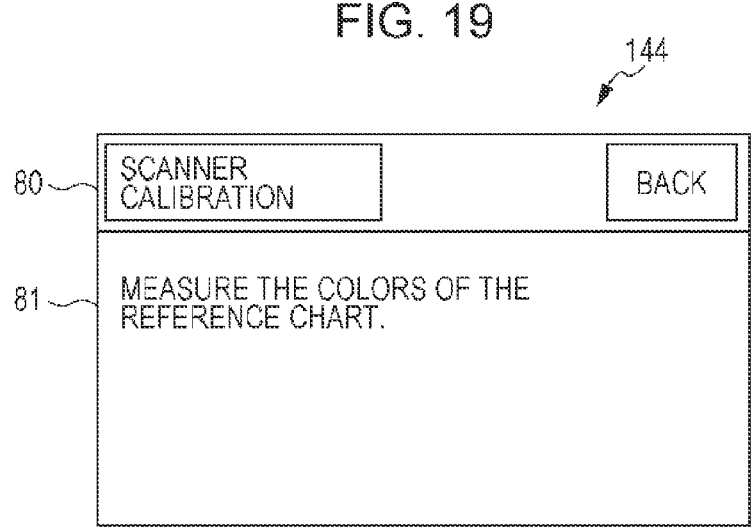
FIG. 19 is a diagram illustrating the "scanner calibration" screen displayed upon printout of a reference chart.

FIG. 19 is a diagram illustrating the "scanner calibration" screen displayed upon printout of the reference chart.

The "scanner calibration" screen displays a message "Measure the colors of the reference chart."

Then, the color measurement is performed for each of plural patches on the printed-out reference chart by the colorimeter. Color measurement data obtained by the color measurement is captured by the image forming apparatus 1 via the USB connector 11 (see FIGS. 1 and 3).

Figure 20:
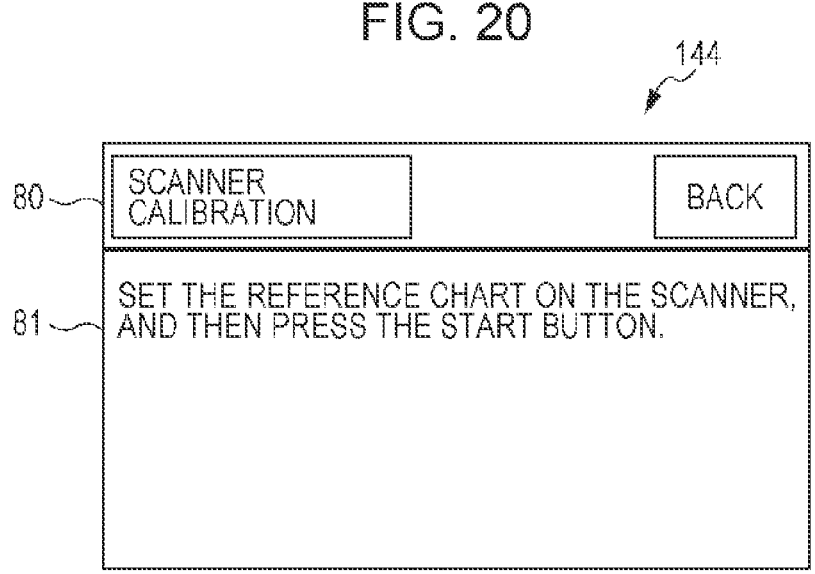
FIG. 20 is a diagram illustrating a screen displayed upon completion of color measurement of the reference chart.

FIG. 20 is a diagram illustrating a screen displayed upon completion of the color measurement of the reference chart.

The screen displays a message "Set the reference chart on the scanner, and then press the start button."

Then, the reference chart is set on the scanner 10, and the start button 141 (see FIG. 4) is pressed (YES at step S303). Thereby, the reading of the reference chart by the scanner 10 is performed (step S304).

Then, a correction function associating the color measurement data and the data read by the scanner 10 is generated (step S305) and stored (step S306). Thereby, the calibration of the scanner 10 is completed. After the calibration, images of the same density and the same color are corrected with the correction function irrespective of the position in the scanner 10 at which the images are read, and thereby the same image data is obtained. However, if undesirable color measurement data is obtained owing to, for example, an error in the measurement by the colorimeter, the calibration fails, and thus the calibration data obtained this time is discarded.

Figure 21:
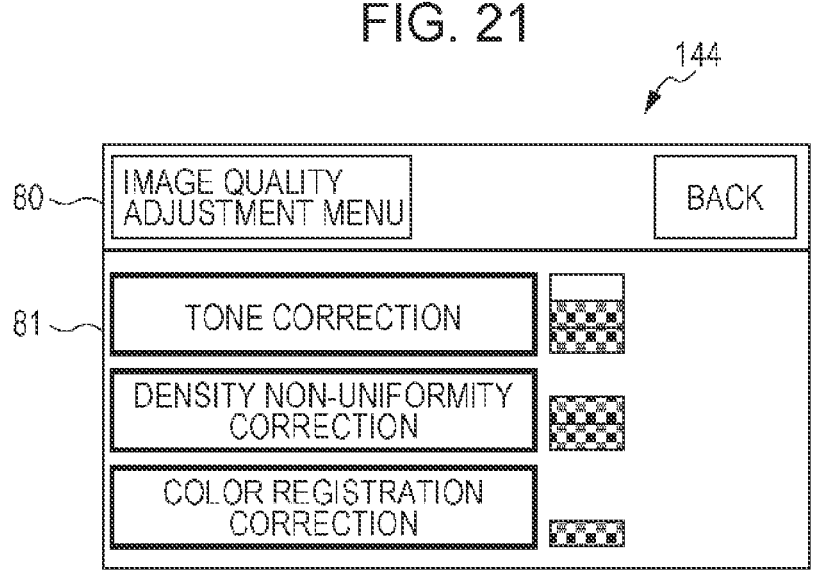
FIG. 21 is a diagram illustrating the "image quality adjustment menu" screen after the selection of an image quality adjustment level.

FIG. 21 is a diagram illustrating the "image quality adjustment menu" screen displayed after the selection of the image quality adjustment level.

If the level of the image quality adjustment is selected as described above, the display screen returns to the "image quality adjustment menu" screen, and the display of the menu field 81 is changed as illustrated in FIG. 21.

In the menu field 81 of the "image quality adjustment menu" screen illustrated in FIG. 21, three buttons of a "tone correction" button, an "density non-uniformity correction" button, and a "color registration correction" button are arranged. The "image quality adjustment menu" screen illustrated in FIG. 21 is displayed when "level 2" is selected as the image quality adjustment level. Three frames corresponding to levels 1 to 3 are displayed next to the "tone correction" button. Since "level 2" is selected in this case, two of the three frames are filled in.

Further, two frames are displayed next to the "density non-uniformity correction" button. This is consistent with that there are only two levels of level 1 and level 2 for the "density non-uniformity correction," as illustrated in FIG. 5. Since "level 2" is selected in this case, the two frames are both filled in.

Further, only one frame is displayed next to the "color registration correction" button. This is consistent with that there is only "level 1" for the "color registration correction." Therefore, the single frame is filled in at any of levels 1 to 3.

Figure 22:
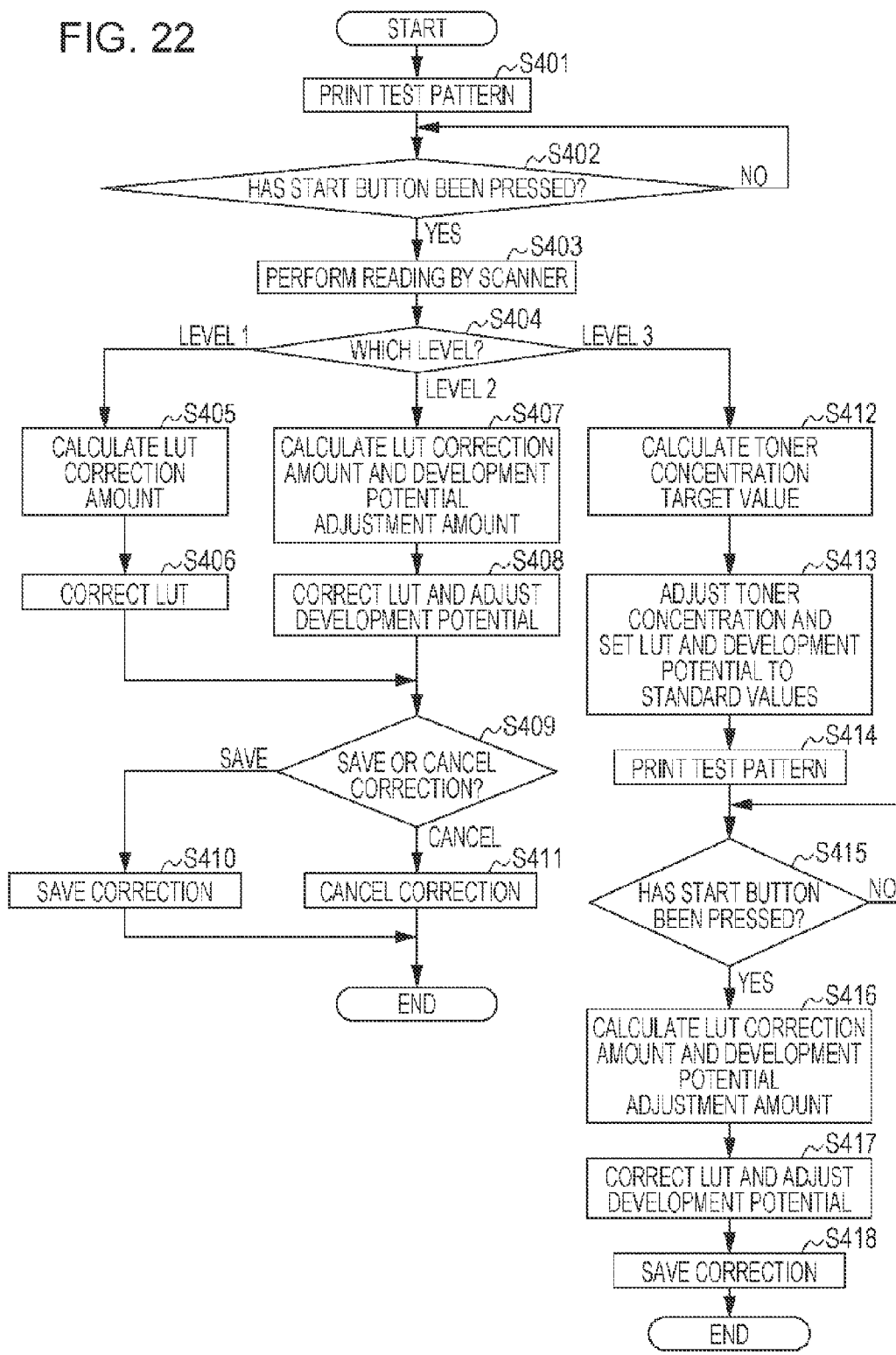
FIG. 22 is a flowchart illustrating the tone correction process.

FIG. 22 is a flowchart illustrating the tone correction process.

If the "tone correction" button is pressed on the "image quality adjustment menu" screen illustrated in FIG. 21, the tone correction process illustrated in FIG. 22 starts.

The flowchart of FIG. 22 corresponds to each of levels 1 to 3.

In this process, the test pattern 71 as illustrated in FIG. 6 is first printed out (step S401).

Figure 23:
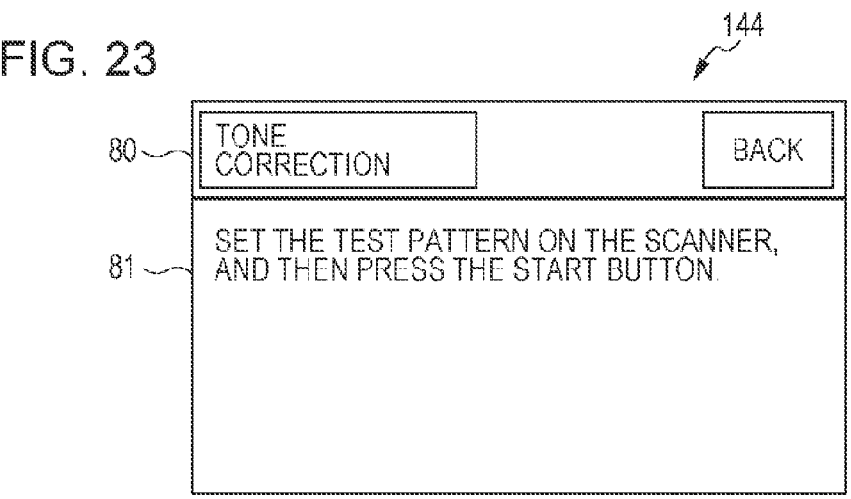
FIG. 23 is a diagram illustrating a screen displayed upon printout of the test pattern.

FIG. 23 is a diagram illustrating a "tone correction" screen displayed upon printout of the test pattern 71.

As illustrated in FIG. 23, the menu field 81 of the "tone correction" screen displays, in place of a menu, a message "Set the test pattern on the scanner, and then press the start button."

Then, the user 1A (see FIG. 2) sets the test pattern 71 on the scanner 10. That is, a sheet having the test pattern 71 printed out thereon is placed on the transparent glass plate 13 (see FIG. 3) of the scanner 10 such that the test pattern 71 faces down, and the platen cover 12 is closed. After the setting, the start button 141 provided on the UI panel 14 (see FIG. 4) of the scanner 10 is pressed.

The scanner 10 waits until the start button 141 is pressed (step S402). If the start button 141 is pressed, the reading of the test pattern 71 by the scanner 10 is performed (step S403).

Figure 24:
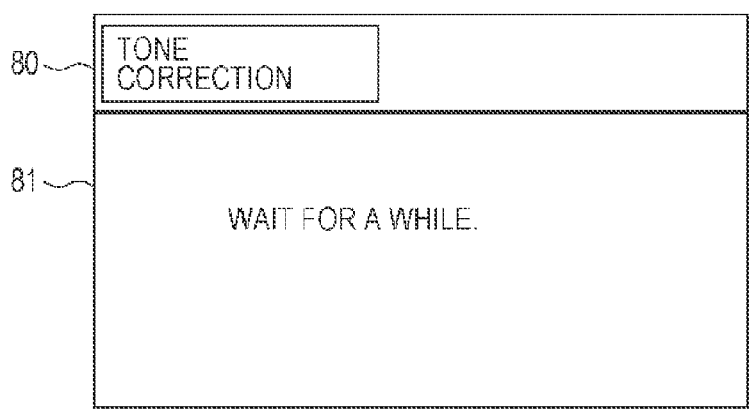
FIG. 24 is a diagram illustrating a screen displayed upon pressing of a start button.

FIG. 24 is a diagram illustrating a screen displayed upon pressing of the start button 141. As illustrated in FIG. 24, when the reading of the test pattern 71 by the scanner 10 starts upon pressing of the start button 141, the menu field 81 displays a message "Wait for a while."

When the reading of the test pattern 71 by the scanner 10 (step S403) is completed, the level of the image quality adjustment of this time is determined (step S404) to perform the correction according to the level.

If the image quality adjustment level of this time is determined as "level 1," the process proceeds to step S405 to calculate the correction amount of the LUT, and the LUT is corrected (step S406; see FIG. 7).

If the image quality adjustment level of this time is determined as "level 2," the process proceeds to step S407 to calculate the correction amount of the LUT and the adjustment amount of the development potential, and the correction of the LUT and the adjustment of the development potential are performed (step S408). Description of an algorithm for determining the degree of adjustment of the development potential and an algorithm for determining how to correct the LUT will be omitted here. The same applies to correction processes described later.

Figure 25:
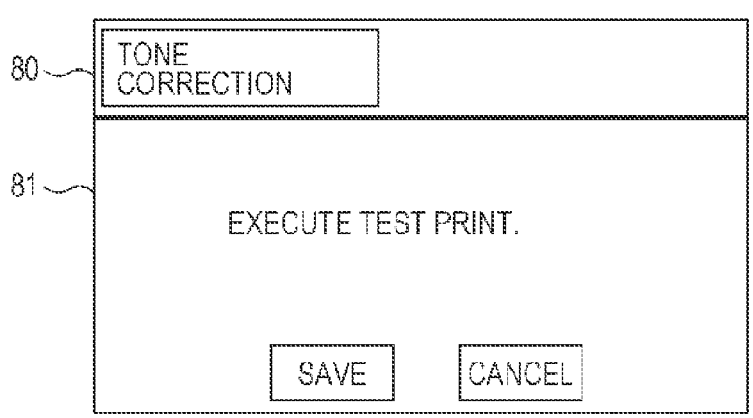
FIG. 25 is a diagram illustrating a screen displayed upon completion of the correction.

FIG. 25 is a diagram illustrating a screen displayed upon completion of the correction.

The menu field 81 of the screen displays a message "Execute test print," and two buttons of a "save" button and a "cancel" button.

The user 1A checks the display, sets on the scanner 10 a document recorded with an image interesting to the user 1A, and presses the start button 141. Thereby, the image on the document is read, and a copy of the image is printed out by the image forming unit 30. The user 1A checks the printed-out copy image, and presses the "save" button or the "cancel" button on the screen illustrated in FIG. 25.

If the "save" button is pressed, the correction amount (adjustment amount) of this time is saved such that the correction of this time is effective in the next and subsequent image forming operations (step S410), and the display screen returns to the screen illustrated in FIG. 21. If the "cancel" button is pressed, the LUT and the development potential are restored to the values before the correction (adjustment) of this time (step S411), and the display screen returns to the screen illustrated in FIG. 21. In this case, the correction amount (adjustment amount) of this time is not reflected in the next and subsequent image forming operations, and the set value before the correction (adjustment) of this time continues to be effective.

If the image quality adjustment level of this time is determined as "level 3" at step S404, the target value of the toner concentration TC relative to the standard values of the LUT and the development potential is calculated (step S412), and the toner concentration is adjusted (step S413). In this process, the LUT and the development potential are set to the standard values.

When the adjustment of the toner concentration is completed, the test pattern 71 (see FIG. 6) is again printed out (step S414). Then, the display screen illustrated in FIG. 23 is again displayed.

The user 1A then sets on the scanner 10 the test pattern 71 printed out again, and presses the start button 141 (YES at step S415). Thereby, the display screen switches to the screen of FIG. 24, and the correction amount of the LUT and the adjustment amount of the development potential are calculated (step S416). Then, the correction of the LUT and the adjustment of the development potential are performed (step S417). Since the toner concentration has already been changed in this case, there is no option of cancelling the correction amount (adjustment amount) of this time. Therefore, the correction amount (adjustment amount) of this time is just saved (step S418), and the display screen returns to the screen of FIG. 21.

Figure 26:
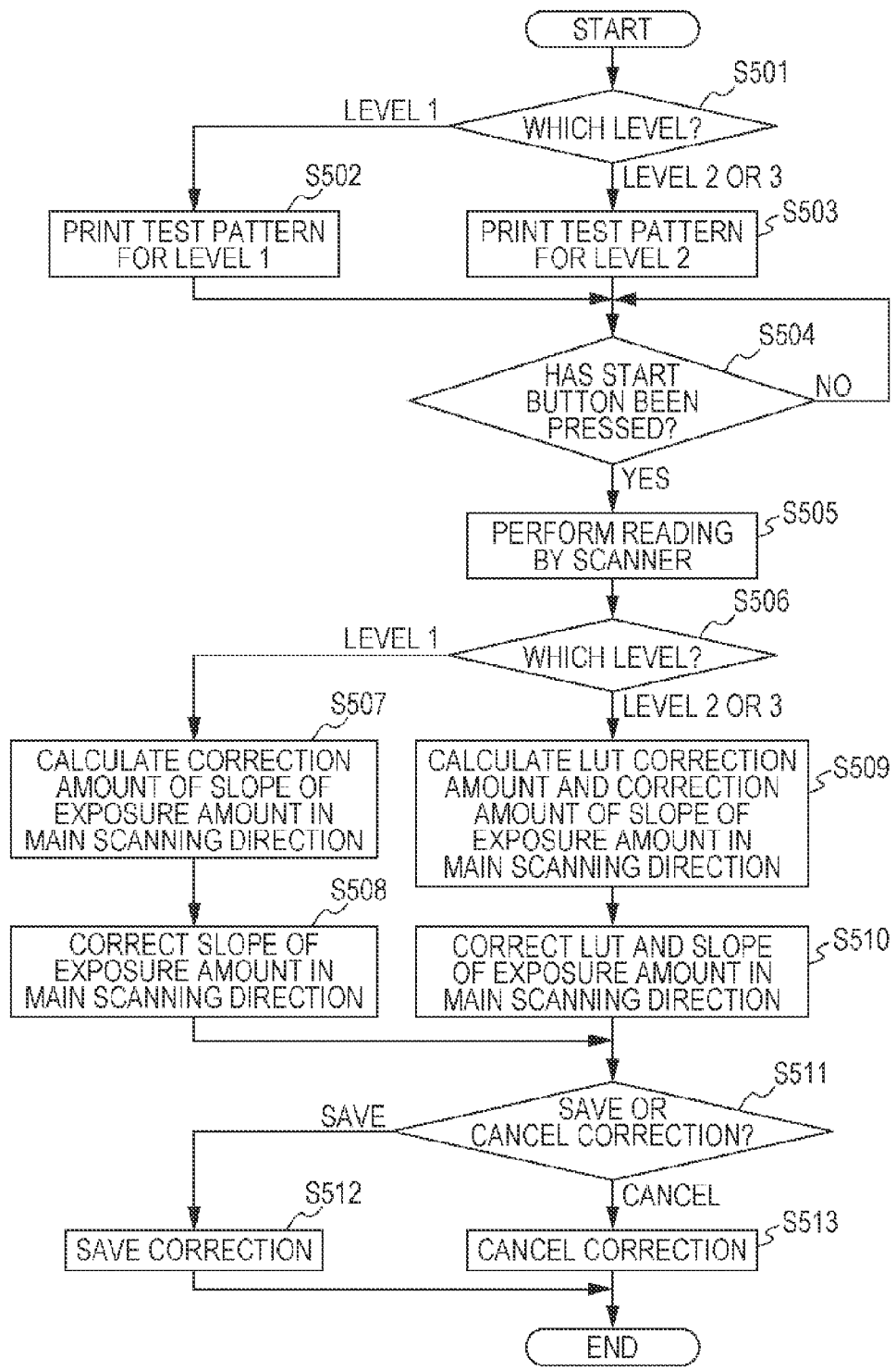
FIG. 26 is a flowchart illustrating the density non-uniformity correction process.

FIG. 26 is a flowchart illustrating the density non-uniformity correction process.

If the "density non-uniformity correction" button is pressed on the "image quality adjustment menu" screen illustrated in FIG. 21, the density non-uniformity correction process illustrated in FIG. 26 starts.

The flowchart of FIG. 26 corresponds to each of levels 1 and 2.

In this process, it is first determined whether the image quality adjustment level of this time is "level 1" or "level 2 (or level 3)" (step S501). If the image quality adjustment level of this time is determined as "level 1," the test pattern 72A for level 1 (see FIG. 9A) is printed out. If the image quality adjustment level of this time is determined as "level 2," the test pattern 72B for level 2 (see FIG. 9B) is printed out.

Figure 27:
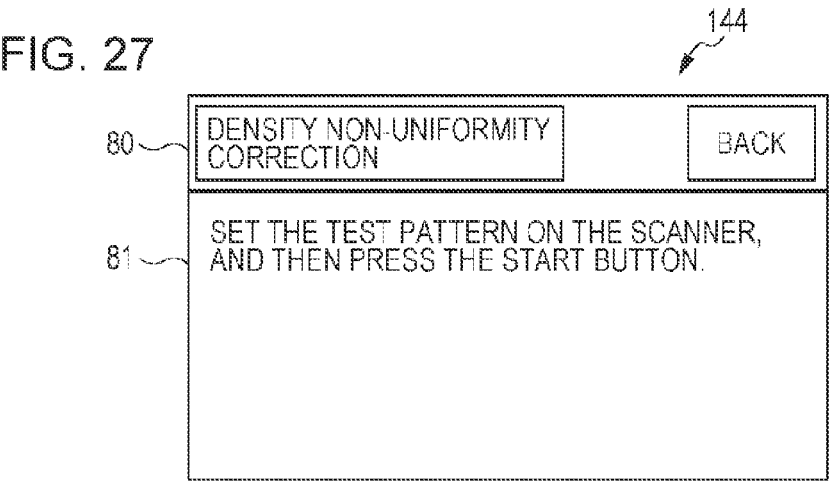
FIG. 27 is a diagram illustrating an "density non-uniformity correction" screen displayed upon printout of the test pattern.

FIG. 27 is a diagram illustrating an "density non-uniformity correction" screen displayed upon printout of the test pattern 72A or 72B.

The menu field 81 of the "density non-uniformity correction" screen displays a message "Set the test pattern on the scanner, and then press the start button."

Then, the test pattern 72A printed out at step S502 or the test pattern 72B printed out at step S503 is set on the scanner 10, and the start button 141 (see FIG. 4) is pressed (YES at step S504). Thereby, the set test pattern 72A or 72B is read by the scanner 10 (step S505).

Figure 28:
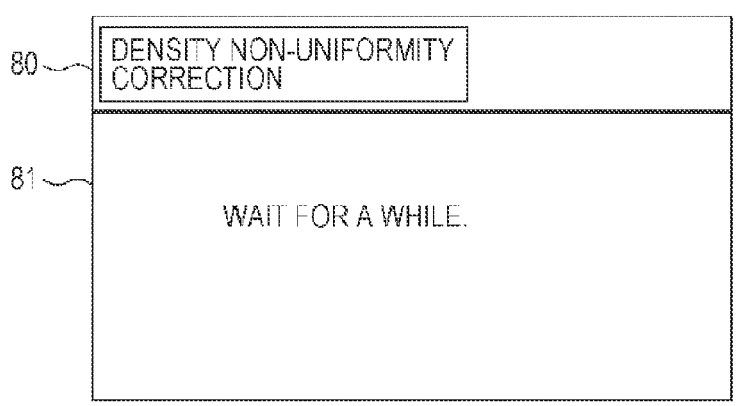
FIG. 28 is a diagram illustrating a screen displayed upon pressing of the start button.

FIG. 28 is a diagram illustrating a screen displayed upon pressing of the start button 141.

The screen displays a message "Wait for a while."

When the reading of the test pattern 72A or 72B by the scanner 10 is completed, the image quality adjustment level is again determined (step S506). If the image quality adjustment level is determined as "level 1," the slope of the exposure amount in the main scanning direction is corrected (step S508; see FIG. 10). This process corresponds to the "analog exposure control" illustrated in FIG. 5.

Meanwhile, if the image quality adjustment level is determined as "level 2," the correction amount of the LUT including the position in the main scanning direction as an input variable (see FIG. 11) and the correction amount of the slope of the exposure amount in the main scanning direction are calculated (step S509). Then, the LUT (see FIG. 11) and the slope of the exposure amount in the main scanning direction (see FIG. 10) are corrected (step S510). The correction of the LUT corresponds to the "digital image processing" illustrated in FIG. 5.

Figure 29:
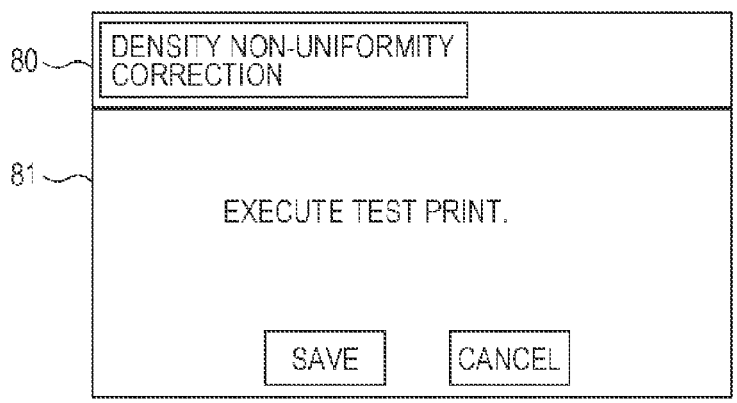
FIG. 29 is a diagram illustrating a screen displayed upon completion of the correction.

FIG. 29 is a diagram illustrating a screen displayed upon completion of the correction at step S508 or step S510.

The menu field 81 of the screen displays a message "Execute test print," and two buttons of a "save" button and a "cancel" button.

Herein, test print is executed by the user 1A. That is, at this step, the scanner 10 is caused to read a document interesting to the user 1A, and the image forming unit 30 is caused to print out a copy image. If the user 1A checking the copy image considers that the density non-uniformity correction of this time has succeeded, the user 1A presses the "save" button. If the user 1A considers that the density non-uniformity correction of this time has failed, the user 1A presses the "cancel" button.

If the "save" button is pressed, the correction of this time is saved to be reflected in the next and subsequent image forming operations, and the display screen returns to the screen illustrated in FIG. 21.

If the "cancel" button is pressed, the setting is restored to the previous state such that the correction of this time is not reflected in the next and subsequent image forming operations and that the state before the correction of this time is obtained, and the display screen returns to the screen illustrated in FIG. 21.

Figure 30:
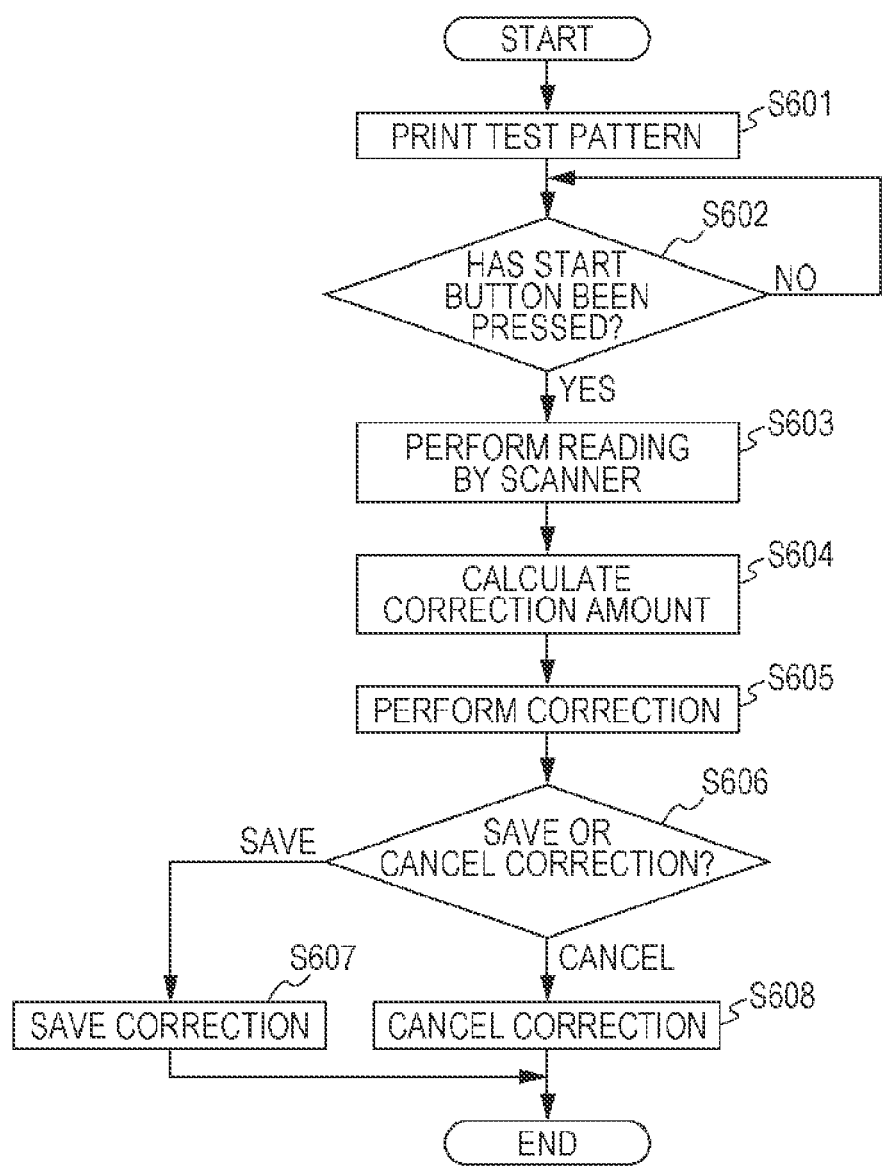
FIG. 30 is a flowchart illustrating the color registration correction process.

FIG. 30 is a flowchart illustrating the color registration correction process.

If the "color registration correction" button is pressed on the "image quality adjustment menu" screen illustrated in FIG. 21, the color registration correction process illustrated in FIG. 30 starts.

As illustrated in FIG. 5, the adjustment item for the "color registration" is present only at "level 1." Therefore, the color registration correction process is performed at any of "level 1" to "level 3" irrespective of the image quality adjustment level of this time.

In this process, the test pattern 73 (see FIG. 12) is first printed out (step S601).

Figure 31:
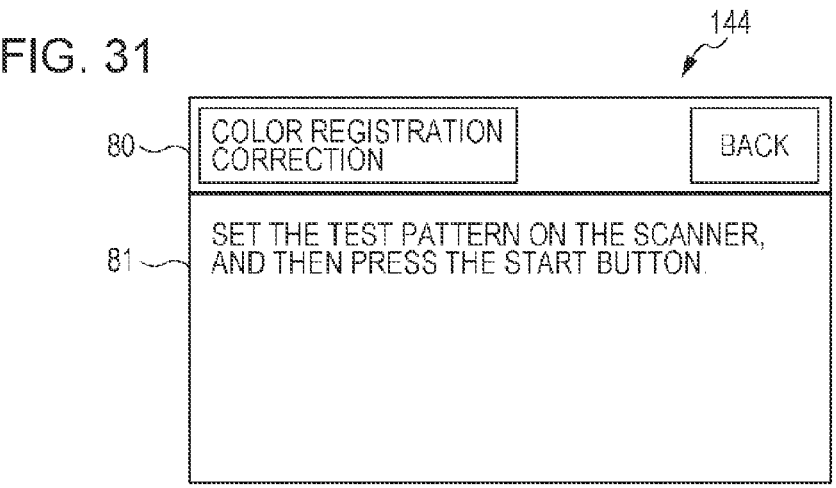
FIG. 31 is a diagram illustrating a "color registration correction" screen displayed upon printout of the test pattern.

FIG. 31 is a diagram illustrating a "color registration correction" screen displayed upon printout of the test pattern 73.

The menu field 81 of the "color registration correction" screen displays a message "Set the test pattern on the scanner, and then press the start button."

Then, the test pattern 73 printed out at step S601 is set on the scanner 10, and the start button 141 (see FIG. 4) is pressed (YES at step S602). Thereby, the set test pattern 73 is read by the scanner 10 (step S603).

Figure 32:
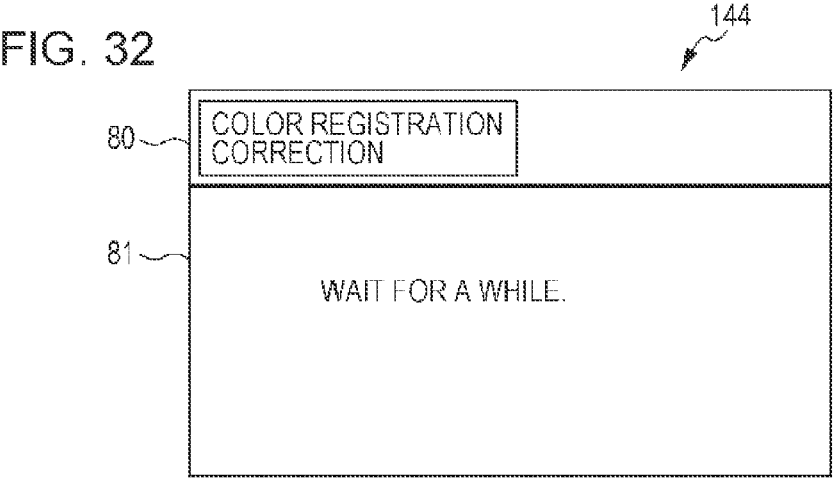
FIG. 32 is a diagram illustrating a screen displayed upon pressing of the start button.

FIG. 32 is a diagram illustrating a screen displayed upon pressing of the start button 141.

The screen displays a message "Wait for a while."

When the reading of the test pattern 73 by the scanner 10 is completed, the correction amount of the color registration correction is calculated (step S604), and the correction is performed (step S605).

Figure 33:
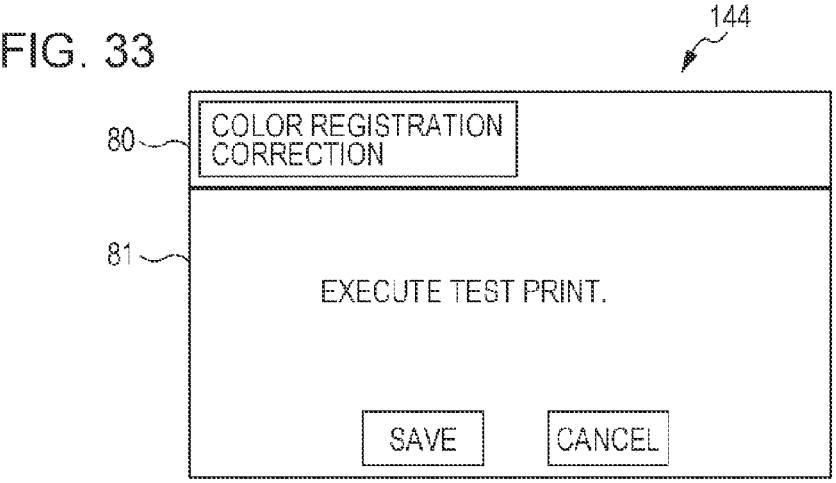
FIG. 33 is a diagram illustrating a screen displayed upon completion of the correction at a step of the color registration correction process.

FIG. 33 is a diagram illustrating a screen displayed upon completion of the correction at step S605.

The menu field 81 of the screen displays a message "Execute test print," and two buttons of a "save" button and a "cancel" button.

Then, test print is executed by the user 1A. That is, at this step, the scanner 10 is caused to read a document interesting to the user 1A, and the image forming unit 30 is caused to print out a copy image. If the user 1A checking the copy image considers that the color registration correction of this time has succeeded, the user 1A presses the "save" button. If the user 1A considers that the color registration correction of this time has failed, the user 1A presses the "cancel" button.

If the "save" button is pressed, the correction of this time is saved to be reflected in the next and subsequent image forming operations, and the display screen returns to the screen illustrated in FIG. 21.

If the "cancel" button is pressed, the setting is restored to the previous state such that the correction of this time is not reflected in the next and subsequent image forming operations and that the state before the correction of this time is obtained, and the display screen returns to the screen illustrated in FIG. 21.

In the present exemplary embodiment, the "tone," the "density non-uniformity," and the "color registration" have been described as image quality determining factors. The present invention, however, is similarly applicable to various other image quality determining factors. Further, in the present exemplary embodiment, three adjustment items are prepared for the "tone" and assigned to level 1, level 2, and level 3, respectively. However, a larger number of adjustment items may be prepared for the "tone." In that case, the depth of the hierarchy may be increased, not limited to the three-level depth. Further, plural adjustment items may be assigned to the same level. The same applies to the "density non-uniformity," the "color registration," and other image quality determining factors. The number of adjustment items is not limited.

Further, in the present exemplary embodiment, whether or not the scanner 10 is calibrated has been described as an example of "the state of the image forming apparatus affecting the accuracy of the adjustment of the set value performed by the image quality adjusting unit" according to an exemplary embodiment of the present invention. However, whether or not the scanner 10 is calibrated is illustrative, and any other factor may be determined as "the state of the image forming apparatus affecting the accuracy of the adjustment of the set value performed by the image quality adjusting unit."

Further, in the present exemplary embodiment, the image forming apparatus 1 of the type illustrated in FIG. 1 has been described as an example. However, the image forming apparatus according to an exemplary embodiment of the present invention is not limited to that type. The present invention is applicable to various types of image forming apparatuses including an inkjet image forming apparatus, for example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image quality adjustment level selecting unit that selects one of a plurality of image quality adjustment levels each assigned to one of a plurality of adjustment items for adjusting the image forming apparatus, the plurality of adjustment items affecting an image quality determining factor that determines image quality of an image to be formed, the plurality of adjustment items being different from each other;
   an image quality adjusting unit that adjusts a value of each of the adjustment items assigned to the image quality adjustment level selected by the image quality adjustment level selecting unit and any other image quality adjustment level shallower than the selected image quality adjustment level such that the image quality corresponding to the image quality determining factor approaches predetermined image quality; and
   an image forming unit that forms the image having image quality according to the value adjusted by the image quality adjusting unit.

2. The image forming apparatus according to claim 1, further comprising:
   a communicating unit that communicates with a remote controlling apparatus that controls the image forming apparatus via a communication line,
   wherein the image quality adjustment level selecting unit selects one or more relatively shallow image quality adjustment levels of the plurality of image quality adjustment levels in accordance with an instruction from a user of the image forming apparatus, and selects one or more relatively deeper image quality adjustment levels of the plurality of image quality adjustment levels in accordance with an instruction from the remote controlling apparatus via the communication line.

3. The image forming apparatus according to claim 1, wherein the image quality adjustment level selecting unit selects, from at least some of the plurality of image quality adjustment levels, a combination of image quality adjustment levels having a different depth according to the state of the image forming apparatus affecting the accuracy of the adjustment of the value performed by the image quality adjusting unit.

4. The image forming apparatus according to claim 2, wherein the image quality adjustment level selecting unit selects, from at least some of the plurality of image quality adjustment levels, a combination of image quality adjustment levels having a different depth according to the state of the image forming apparatus affecting the accuracy of the adjustment of the value performed by the image quality adjusting unit.

5. An image forming method comprising:
   selecting one of a plurality of image quality adjustment levels each assigned to one of a plurality of adjustment items different from each other affecting an image quality determining factor that determines image quality;
   adjusting a value of each of the adjustment items assigned to the selected image quality adjustment level and any other image quality adjustment level shallower than the selected image quality adjustment level such that the image quality corresponding to the image quality determining factor approaches predetermined image quality; and
   forming an image having image quality according to the adjusted value.

6. The image forming apparatus according to claim 1, wherein at any other image quality adjustment level shallower than the selected image quality adjustment level, a risk of image quality deterioration and a degree of freedom of image quality adjustment are lower than at the selected image quality adjustment level, and
   wherein at any other image quality adjustment level deeper than the selected image quality adjustment level, the risk of image quality deterioration and the degree of freedom of image quality adjustment are higher than at the selected image quality adjustment level.

* * * * *